(No Model.) 4 Sheets—Sheet 2.

A. J. SMITH.
MANUFACTURE OF WHITE LEAD.

No. 501,377. Patented July 11, 1893.

(No Model.) 4 Sheets—Sheet 3.

A. J. SMITH.
MANUFACTURE OF WHITE LEAD.

No. 501,377. Patented July 11, 1893.

Witnesses:
J. A. Rutherford
Robert Everett

Inventor:
Arthur James Smith
By James L. Norris
Attorney (No Model.) 4 Sheets—Sheet 4.
A. J. SMITH.
MANUFACTURE OF WHITE LEAD.
No. 501,377. Patented July 11, 1893.
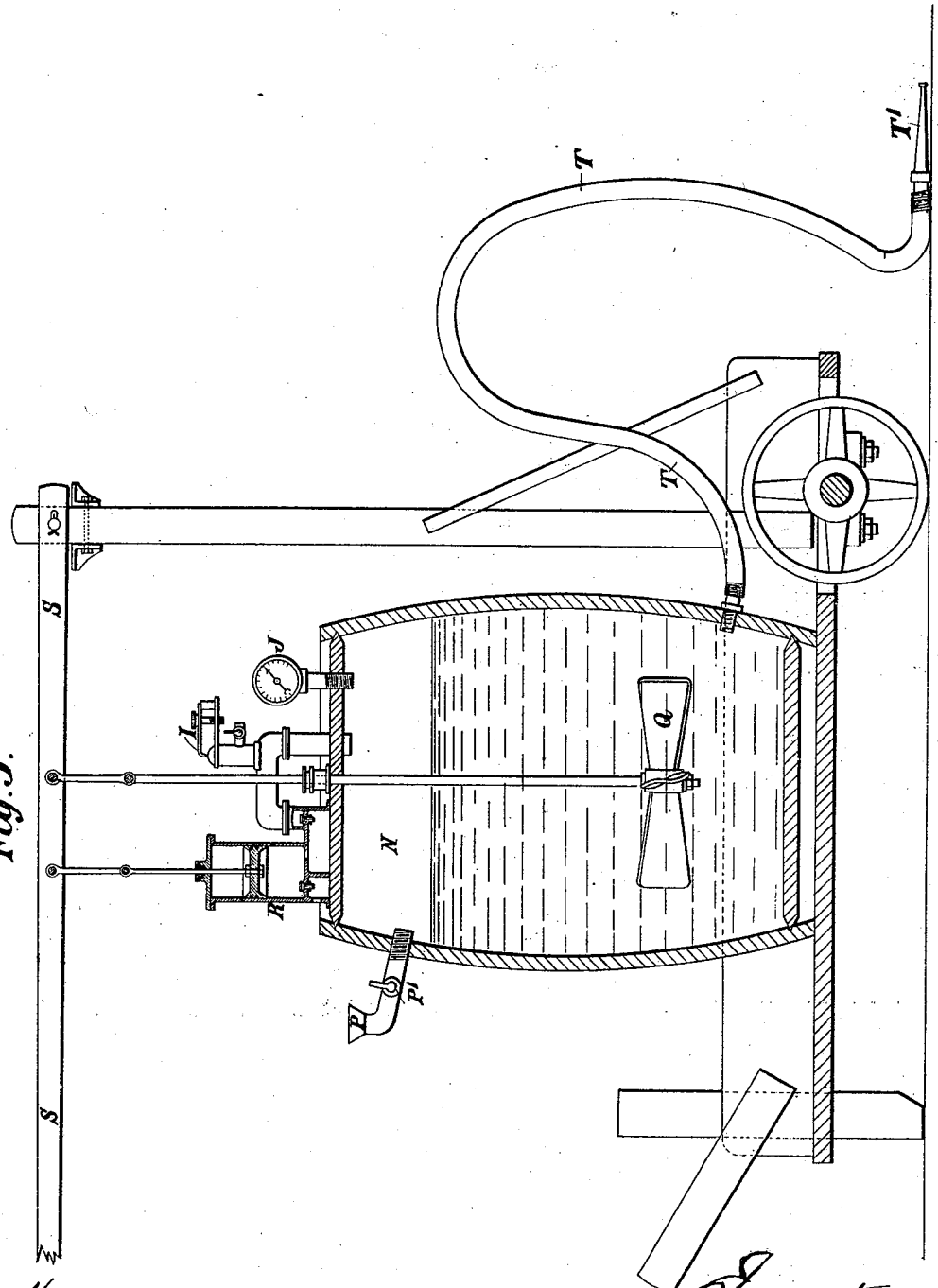

UNITED STATES PATENT OFFICE.

ARTHUR JAMES SMITH, OF LONDON, ENGLAND.

MANUFACTURE OF WHITE LEAD.

SPECIFICATION forming part of Letters Patent No. 501,377, dated July 11, 1893.

Application filed September 12, 1892. Serial No. 445,700. (No specimens.)

*To all whom it may concern:*

Be it known that I, ARTHUR JAMES SMITH, chemist, a subject of the Queen of Great Britain, residing at Kingston-on-Thames, London, in the county of Surrey, England, have invented new and useful Improvements in and Relating to the Manufacture of White Lead, of which the following is a specification.

The main object of my invention is to provide for the production of a pure white lead containing the proper percentage of the actual pigment compound (that is to say, of the minute rounded and opaque particles which have no signs of crystallization) necessary to impart to the paint or pigment as high a covering power as is practically consistent with the preservation of the requisite capacity for effecting the solidification or drying and hardening of the oil used in the paint or pigment, such percentage being much larger than that contained in white lead made by any of the processes heretofore devised.

My said invention is, moreover, designed to provide for the manufacture of good commercial white lead in a more expeditious and effective manner and at a much lower cost than is practicable by the processes hitherto devised.

Figure 1:
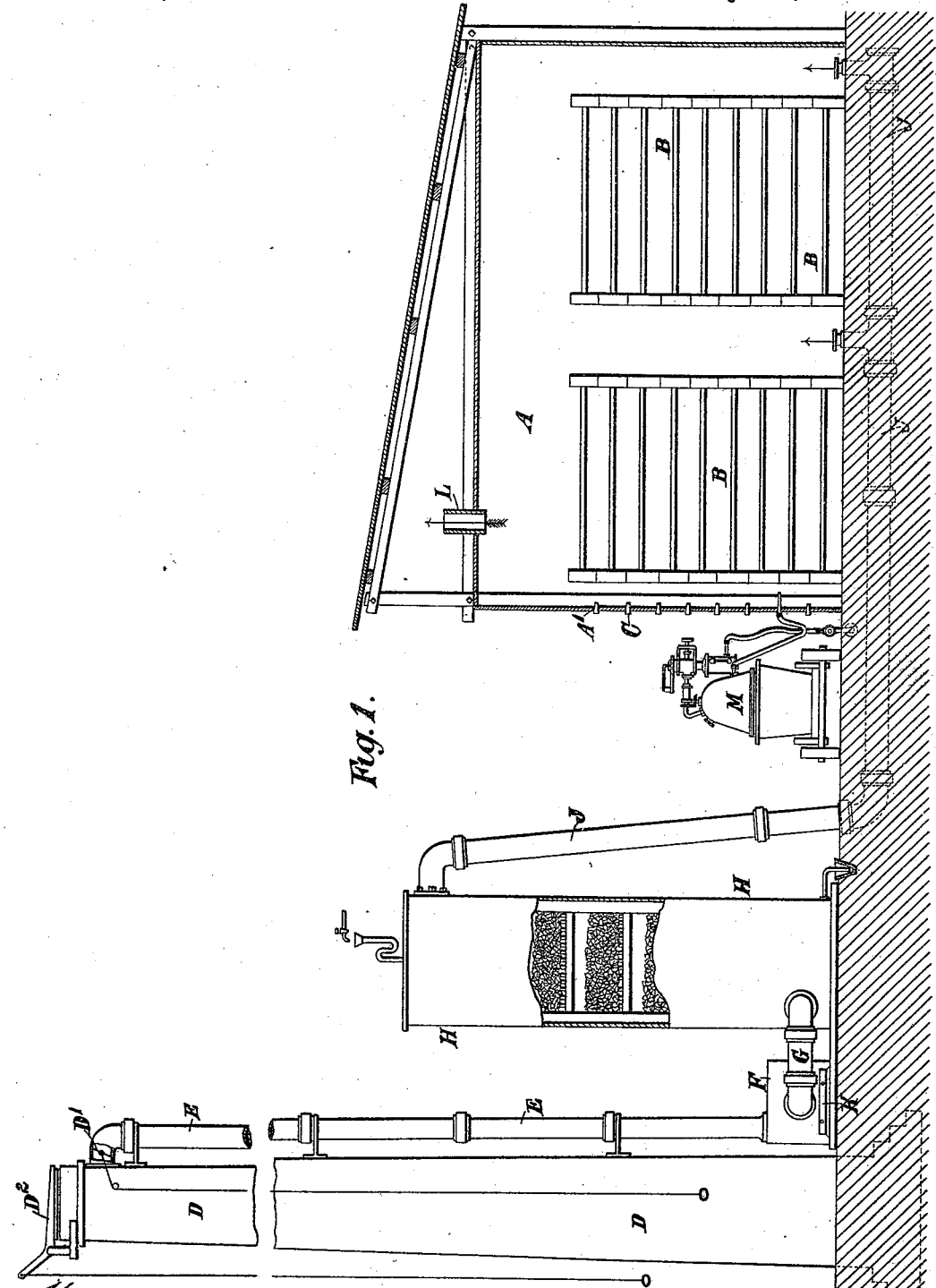
Figure 2:
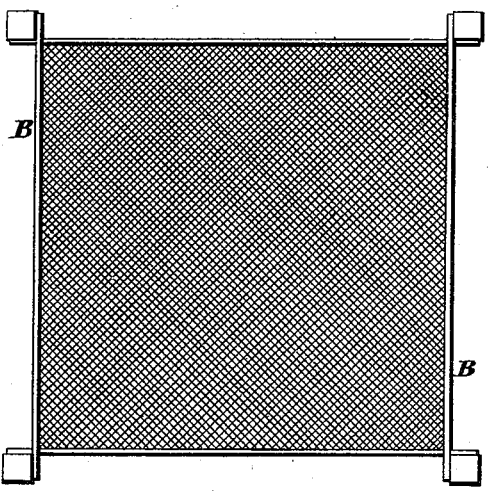
Figure 3:
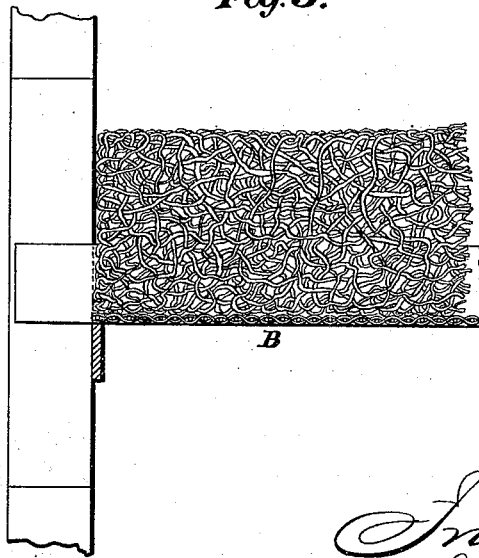
Figure 4:
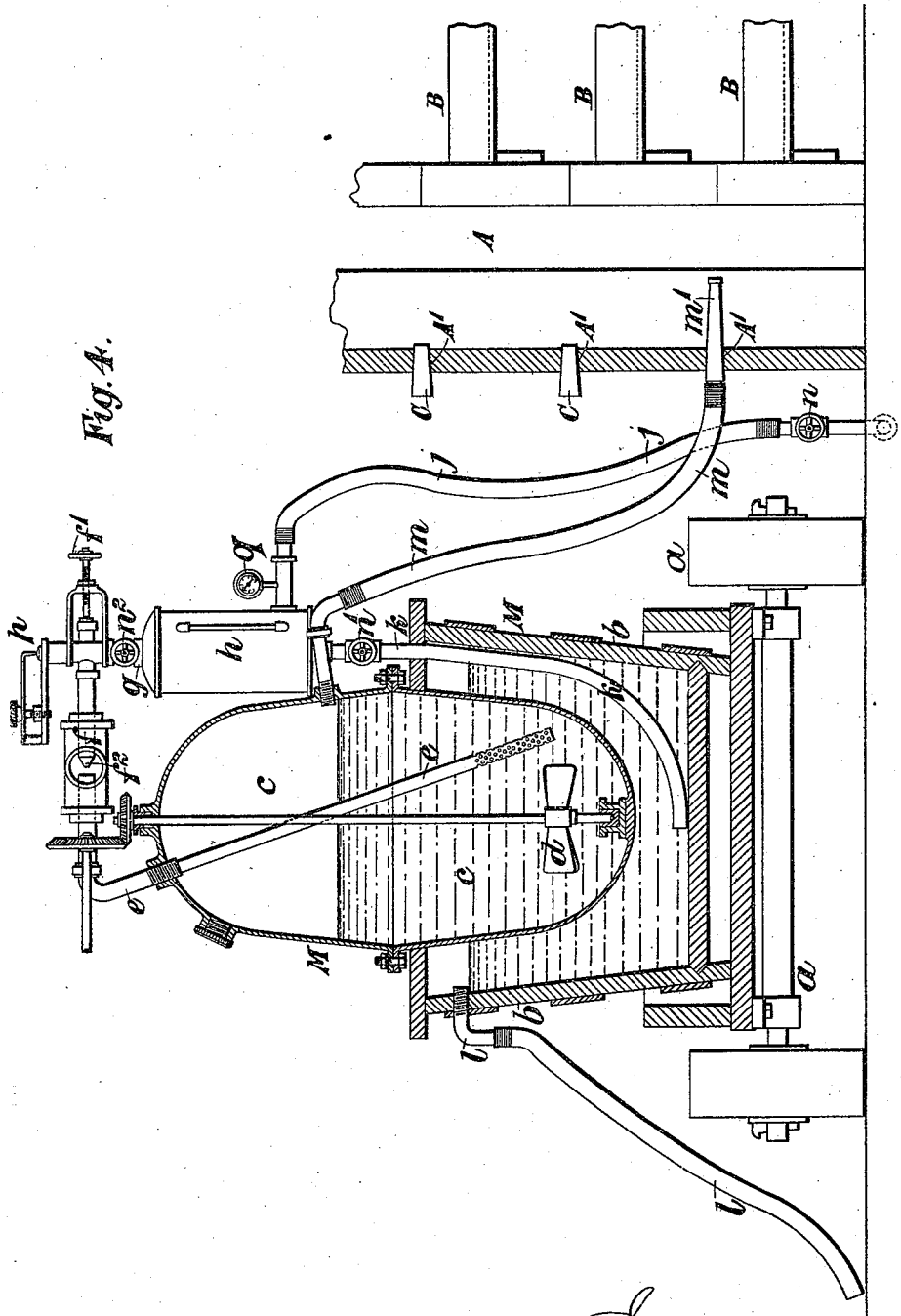

In the drawings illustrating an apparatus for carrying my invention into effect—Figure 1 is a side elevation, partly in vertical section showing one of the corroding chambers and means for supplying the same with the corroding agents. Fig. 2 is a plan, drawn to an enlarged scale, of one of the corroding trays or grids made with painted netting as hereinafter described. Fig. 3 is a vertical section, drawn to a still further enlarged scale, showing a portion of one of the said trays, with a charge of lead strips or cutting piled thereon as hereinafter set forth. Fig. 4 is a sectional elevation, also drawn to an enlarged scale, showing a convenient and advantageous form of apparatus for the mixing of the acid vapor, of apparatus for the mixing of the acid vapor, steam and air and the introduction of the same into the corroding chambers, and Fig. 5 is a sectional elevation of a convenient and advantageous form of apparatus for applying a shower or spray of basic cream to the charge to be corroded.

Like letters indicate corresponding parts throughout the drawings.

As is well known, the process heretofore usually adopted for the manufacture of white lead, is that commonly termed the Dutch process, which consists in placing coiled sheets or cast gratings of metallic lead in pots containing dilute acetic acid, and packing such pots in a bed of stable-manure or spent tanbark, one layer of pots being arranged above another. This process is both uncertain and slow in its action and has the further disadvantage of great risk to the operatives by reason of the fumes and dust of lead given off during the operations.

Many attempts have been made to devise cheaper, more perfect and expeditious processes for the production of white lead from blue or metallic lead, but such processes are all more or less unsatisfactory and some of them are impracticable for the reasons hereinafter mentioned. In some of the specifications of prior Letters Patent in which processes of this kind are described, it is stated that the lead is subjected alternately to the action of acetic acid vapor (with or without steam and atmospheric air) and to the action of carbonic acid gas; and, in a few cases, it is also stated that, previous to this treatment, the lead is dipped into or sprinkled with a basic solution, consisting, for example, of a mixture of acetic acid or nitric acid or both with a solution of acetate or nitrate of lead. But the directions given in the said prior specifications are not such as would enable any person skilled in the art of manufacturing white lead to successfully manufacture white lead by the processes described. And, as far as I am aware, none of the said processes have ever been carried into practice on a commercial scale.

Among the chief causes of failure of such processes, I would mention the following, viz:—The lack of proper proportion between the dimensions of the lead strips or cuttings and the height of the pile of the said strips or cuttings on the trays, in the corroding or converting chambers, and the consequent insufficiency of the vapor ways through the charge; the want of proper relative duration of the periods of treatment with acid vapors, steam, atmospheric air, and carbonic acid gas and the want of variation in the strength and concentration of the acids; and the presumption that all portions of the entire charge must be treated alike notwithstanding the fact that the corrosion always takes place unequally throughout the charge, and therefore different portions of the charge require to be differently treated according to their more or less corroded condition at various periods or stages of the process. In short, I would say that the processes heretofore described have been unsuccessful because of the lack of this and other knowledge as to how to properly control the chemical actions comprised in the corrosion of the lead.

In the specification of an English patent, dated September 15, 1882, No. 4,405, and granted to me, I described a process of manufacturing white lead, and, in that specification, it is stated that the metallic lead is first formed into fine threads or fibers in order to present a very extended surface to the action of the corroding agents and to provide suitable vapor ways through the charge. But I have since found that the threads or fibers of lead described in the specification of my English patent are much too fine to produce the desired results, the dimensions thereof, as stated in the specification being three fourths of a millimeter in breadth by one-fourth of a millimeter in thickness at the center; and I have also ascertained that the height of the pile of the said threads or fibers, as stated in the specification above referred to viz: about fifty millimeters is much too great in proportion to the dimensions of the lead fibers.

Since obtaining the aforesaid English patent I have found, after a great number of experiments and practical trials of the process, that, with such fine threads or fibers piled in the manner described in the said former specification, it is not practicable to carry on the manufacture of white lead in an efficient manner or on a commercial scale. If such threads or fibers are piled to a height of fifty millimeters the charge on each tray, when only partially corroded, sinks and thus closes or contracts the spaces or interstices through which the corroding vapors and gases permeate, so that the said vapors and gases can no longer reach the lower portions of the charge, and consequently the said charge is imperfectly or incompletely corroded, and the product contains a large quantity of metallic or incorroded lead. I have found, moreover, that the proper height of the pile for such fine threads or fibers, to insure efficient corrosion, is about three-eighths of an inch or about nine or ten millimeters. It is obvious, however, that the manufacture of white lead with such fine lead fibers piled to this height, would be the reverse of economical, by reason of the immense quantity of trays required for such manufacture on a large scale.

Now, by my numerous practical experiments I have ascertained that, in order to effect the uniform and complete corrosion of the entire charge of lead, and to obtain a product containing the desired percentage of the pigment compound, the process must comprise certain essential steps or stages and certain conditions must be fulfilled, that is to say:—In the process of corrosion it is of very great importance, in the first instance, that the strips or cuttings of metallic lead should be of such dimensions and piled in such a manner that the mass or pile will retain its shape, the strips or cuttings not yielding under their own weight, until the entire charge on the tray is completely corroded; and to insure this result, the dimensions of the lead strips or cuttings and the height of the pile should bear the special relation to each other, and to the quality of the lead to be treated, hereinafter described. It is also very important, in order to produce a really good and durable pigment, that the periods during which the charge is subjected to the action of the acid vapor, steam and atmospheric air should be very short compared with the periods during which the said charge is subjected to the action of the carbonic acid gas; also that the relative duration of these periods and the relative proportions of the acid vapor steam and air should be properly regulated or determined according to the actions observed to be taking place from time to time in the corroding chambers. It is, moreover, of great importance that the acid vapor, steam and air should be applied at intervals to the charge on each of the trays either locally or generally, as required and the strength or concentration of the acid be varied according to the progress of the corrosion in different parts of the said charge. And it is essential to the satisfactory working of the process and the uniform corrosion of the charge that the corrosion should be facilitated by sprinkling or showering upon the said charge at suitable intervals a spray of basic solution or basic cream and this basic cream, like the acid vapor, steam and air, should be applied either locally or generally and should be of greater or less strength or concentration according to the activity or want of activity of the corrosion in the various parts of the charge. The application of the acid vapor and of the basic cream either locally or generally according to the state of the charge from time to time, is necessary by reason of the tendency of the corrosion to become partial or local and frequently to cease altogether in portions of the charge, which tendency has evidently been overlooked by previous inventors.

Now I have devised an improved process of manufacturing white lead, by which the conditions above mentioned are all fulfilled, and by which I am enabled to produce white lead of a greatly superior quality to that hitherto manufactured, with economy of acid and at a much lower cost than has heretofore been practicable.

In carrying my invention into practice, I proceed as follows, viz:—I first produce strips, ribbons or cuttings of lead of any suitable length and of a breadth and thickness varying to some extent according to the character of the metal to be treated, that is to say, according to the tenacity and hardness of such metal; but these lead strips, ribbons or cutting are made of such breadth and thickness as to be capable, when openly entangled and piled as hereinafter described, of retaining their shape and supporting their own weight throughout the entire corrosion and thus maintaining the requisite clear ways or passages for the corroding vapors and gases, without collapsing or sinking, until the corrosion of the entire bulk of the charge has been completed. The breadth and thickness of the lead strips or cuttings should, moreover, be such as to permit the use of a mass or pile of the same of considerable height, say about three inches high, on each corrosion-tray, so that a large quantity of lead can be treated at one time within a comparatively limited space.

In making white lead from metallic lead of the quality usually employed for the purpose, I make the strips, ribbons or cuttings for a pile of three inches high, about one-twelfth of an inch or one-tenth of an inch in breadth and of a mean thickness of about one fortieth or one fiftieth of an inch. As, however, the strength of the strips or cuttings requires to be varied, in some measure, according to the composition or character of the metal to be treated, I take a sample of this metal in the form of strips or cuttings of about the dimensions above stated, and subject these strips or cuttings to a practical test by the process hereinafter described, to ascertain whether it is desirable to use stronger or weaker strips or cuttings. I thus find out the most advantageous dimensions of the said strips or cuttings. These dimensions will, moreover, be somewhat varied according to the desired height of the mass or pile on the corrosion-trays or grids, the strength of the strips or cuttings being slightly increased for a pile of greater height and slightly diminished for a pile of less height. I pile the said strips, ribbons or cuttings of lead in a tangled mass on the corrosion-trays or grids in such a manner that the spaces or ways for the corrosion vapors or gases between adjacent pieces of the said strips or cuttings will be of uniform area throughout the mass or pile of the strips or cuttings such area being (as hereinafter described) that which the most effectually insure the proper action of the corrosion vapors upon and the thorough corrosion of the said strips, ribbons or cuttings. I have found that this piling of the strips or cuttings is best accomplished by taking the spiral or curled cuttings produced by a self-acting lathe or similar cutting tool, in the loosely piled and entangled form in which they are deposited as they fall from the lathe or other cutting tool, and slightly squeezing or pressing the entangled cuttings together, or drawing them apart if necessary, until, on looking through the mass, the collective area of the spaces between the strips or cuttings appears to be about equal to the collective area of the strips or cuttings themselves, and the vapor ways are of approximately uniform area throughout the mass. This arrangement of the strips or cuttings must be very carefully carried out because any outstanding or projecting strip will, by reason of the fuller access thereto of the corrosion vapors, be corroded too rapidly and will fall and block the vapor ways below it. Moreover, if the strips are too closely packed at any part of the charge, the corrosion of this part will be retarded until too great a proportion of the charge is by the application of too much acid vapor basic-cream and steam brought to the state of coarse cystallization, thus diminishing the covering power and opacity of the product.

I make the corrosion trays with suitable frames, preferably of painted wood, and with a bottom or grid of cotton-netting preferably painted to prevent decomposition thereof by the acid, having meshes of about one quarter of an inch across, so as to prevent the dropping of corroded particles from either tray into the tray beneath, while permitting the circulation of the corrosion vapors and gases through the bottom of the trays. I so construct the said corrosion-trays or grids and arrange the same in the corroding chamber that the ways or passages between them for the corrosion vapors and gases will be of a depth equal, or approximately equal, to that of the piles on the trays or grids, say about three inches. Moreover, I make the corroding chamber and the said trays of such relative dimensions that there will be sufficient space around and between adjacent trays and between the trays and the walls of the corroding chamber, to permit the free circulation of the corrosion-vapors and gases by connection as hereinafter described. The width of this space I find should be somewhat greater than the depth of the vapor ways or spaces between two adjacent trays.

I treat the lead strips or cuttings prepared and arranged as above described by means of basic cream, that is to say, by means of basic compounds of suitable hydrates, such as white or other lead oxides, digested to the consistency of thin cream in weak pyroligneous acetic or other suitable acid and water. For this purpose, I prefer to dip or immerse the strips or cuttings in the basic cream or compound, and to allow them to drain before placing them on the corrosion trays or grids. Care must be taken however, that all the metal of the charge is properly covered with the basic cream.

Having placed in the corroding chamber A one above another, the trays or grids B with the lead strips or cuttings piled thereon as above described, I close the said chamber and inject into the same over each of the entire series of trays, a jet or spray of acid vapor, steam and air in proportions regulated as hereinafter described according to the requirements of the charge, by means of an apparatus more clearly shown in Fig. 4 supported upon a suitable truck $a$ so that it may be readily shifted from place to place as required. This apparatus comprises a vessel or tank $b$ containing hot water, in which is partially immersed a closed vessel or receptacle $c$ for the acetic, hydrochloric or other acid to be vaporized, the strength of which acid is varied from time to time as the charge may require. The receptacle $c$ is provided with a stirrer or agitator $d$ and is connected by a pipe $e$ with an injector $f$ for forcing steam, either above or mixed with air, into the said receptacle $c$ beneath the level of the liquid therein, through a fine rose. This injector is connected by a pipe $g$ with a separator $h$ to which steam is supplied through a flexible pipe $j$ from a suitable steam-pipe or main. The water of condensation from the separator $h$ is conducted through a pipe $k$ into the tank $b$ wherein its heat is utilized for evaporating the acid in the receptacle $c$; and an overflow pipe $l$ is provided for the escape of the superfluous water from the said tank $b$. To the upper part of the receptacle $c$ is connected a flexible pipe $m$ provided with a nozzle $m'$ adapted to be inserted through the holes $A'$ in the side or wall of the corroding chamber A for the purpose of introducing the acid vapor, steam and air into the said chamber when and where required, the said hole being closed by readily removable plugs C.

Suitable cocks or valves $n$ $n'$ $n^2$ are provided for controlling the working of the apparatus. The injector $f$ is moreover, provided with a screw-spindle $f'$ for regulating the flow of steam through the same, and the nozzle $f^2$ of the injector is made adjustable for the purpose of regulating or controlling the induction of air into the receptable $c$ by means of said injector. The apparatus is also furnished with a safety-valve $p$ and pressure gage $q$. After subjecting the charge to this treatment for about one hour (more or less as the appearances of the charge may show it requires), I admit to the said chamber, carbonic acid in the form of furnace-gases, conducted for instance from a furnace-shaft D of any suitable description connected by a pipe E with a vortex-chamber F, and provided with dampers or valves $D'$, $D^2$ whereby the flow of the gases or products of combustion may be controlled so as to cause the same to descend through the pipe E by reason of their increased density on cooling, or to allow them to escape into the atmosphere. The vortex-chamber F is connected by a pipe G with the lower end of a coke-tower H, containing dampened coke. The upper end of this tower is connected by a pipe J with the corroding chamber A. The chamber F is provided with a lead-lined tray or drawer K in which are placed suitable substances for generating chlorine, such, for instance, as mixtures of manganese, common salt and sulphuric acid, whereby a sufficient excess of chlorine is mixed with the furnace gases in the chamber F and coke-tower H to purify such gases from sulphur and other deleterious or discoloring compounds before the said gases pass into the chamber A. The chamber A is provided at the top with an outlet pipe L for the escape of air and of the corroding vapors and gases. The sides of the said chambers A are either so made that they can be readily removed and replaced or they are provided with suitable doors which can be opened for the inspection of the charge or to permit the access of air to the said charge, if necessary, for the purpose of drying the same. I allow the carbonic acid gas to diffuse in and through the corroding chamber and at regular intervals say during about one hour (more or less) out of every twenty-four hours. I subject the charge first to the action of a shower or spray of the aforesaid basic cream and then to the action of the acid vapor, steam, and air as above mentioned. I can, if desired, shut off the carbonic acid during the treatment with the acid vapor steam and air and with the basic cream, but I prefer that the diffusion of the carbonic acid gas should be maintained continuously.

The carbonic acid gas should not be forced into the corroding chamber so as to cause a current of such gas to flow through the said chamber.

N. Fig. 5, is a vessel or receptacle for containing the basic cream or compound, which is introduced into it through a funnel P and cock $P'$. The vessel N is provided with a stirrer or agitator Q and with a pump R for forcing air into it under pressure. The said stirrer and pump are both operated by means of a pivoted lever or handle S. A flexible pipe T is connected at one end to the lower part of the vessel N and is provided at its other end with a nozzle $T'$ adapted to be inserted in the holes $A'$ in the side or wall of the corroding chamber A for the purpose of introducing the basic cream into the same when and where required. By means of this apparatus the basic cream can be very readily applied in a shower or spray to the charge on each tray or grid in the corroding chamber either locally or generally as may be required and the strength or concentration of the basic cream can be easily varied from time to time according to the requirements of the charge. The acid vapors which I use are those of pyroligneous acetic, nitric or hydrochloric acid in quantity and concentration such as the character of the lead to be treated may require.

It is of great importance in the manufacture of white lead, that the corrosion should be carried on uniformly throughout the entire charge during the whole of the time occupied by the process. Usually it will be found that the corrosive action goes on unequally in different trays or in different parts of the same tray. To avoid or counteract this unequal corrosive action, I inspect the charge at suitable intervals and, when I find that the corrosion has stopped or is not going on with sufficient rapidity in any part or parts of the charge, I treat the said charge locally where required with a shower or spray of the aforesaid basic solution or basic cream more or less diluted by water according to the appearance of the charge. I prefer to apply this basic cream by a syringe or by means of the apparatus hereinafter described. And I apply the acid vapor-steam and air to the charge at intervals as above specified, either locally or generally, having regard to the rapidity or activity of the corrosion in the various parts of the charge, the strength or concentration of the acid vapor being increased or diminished according to the appearance of the charge, that is to say, I apply more of the acid vapor, steam and air and of the basic cream to those parts of the charge where the corrosive action has ceased or is not going on satisfactorily, than to such parts of the charge where the corrosion is progressing favorably. And, on the other hand, should there be signs of coarse crystallization in any parts of the charge, I withhold the application of the acid vapor, steam and air, and of the basic cream or I apply basic cream to these parts until the corrosion again becomes uniform throughout the charge by the continued action of the carbonic acid gas.

The general directions to be followed, in order to control the chemical reactions and insure uniformity of the corrosion throughout the entire charge, may be briefly stated as follows, viz:—Those parts of the charge which are observed to be too dry, should be treated more frequently with the acid vapors mixed with a larger proportion of steam and less air, and commensurately more concentrated basic cream and acid vapor should be used; or, if the corrosion has stopped these parts should have more basic cream applied to them. Those portions which appear too wet, should be treated with less and weaker acid vapor together with less steam and more air, or should have very weak basic cream applied to them for a suitable period.

Should the growth of crystallization be found to be going on too rapidly, the length of the intervals between the applications of the basic cream and acid vapor, steam and air should be increased and less steam introduced with weaker acid vapor, the basic cream being withheld, if deemed necessary. If, on the other hand, the corrosion should cease and the charge become too dry, the length of the intervals should be diminished and the quantity and strength of the basic cream applied should be increased in addition to strengthening the acid employed. Should the already corroded particles be found to be dissolving, the quantity of basic cream applied should be diminished or the application of such cream should be stopped for a suitable period.

When necessary for drying purposes; for instance when the charge is found to be "sweating" that is to say when the charge appears to be suddenly throwing off water of hydration, and becomes dripping wet throughout, the supply of additional quantities of air to the charge may be provided for, by leaving the corroding chamber open for a suitable period.

The application of basic cream to the charge at intervals either locally or generally as required and of varying strength or concentration according to the state of the charge or of different portions thereof, is essential to the satisfactory working of the process, because in time the basic cream once applied is liable to become decomposed.

The temperature in the corroding chamber is raised above the atmospheric temperature by the heat of the steam and acid vapor introduced as above specified, thus insuring the proper diffusion by convection of the carbonic acid gas and other vapors as the same cool during the interval preceding the next application of the acid vapor and steam. The temperature in the corroding chamber should be kept as low as is practically consistent with the maintenance of the proper diffusion of the carbonic acid gas. This temperature will vary with the atmospheric temperature, and need not be more than thirty degrees above the atmospheric temperature. It is desirable however that the temperature in the corroding chamber should not at any time be raised above say 90° Fahrenheit because of the tendency of the excessive heat to cause the growth of the transparent crystals hereinafter referred to.

The complete corrosion of the lead according to my process, for an ordinary trade sample, should be effected in about from nine to thirteen weeks. The time occupied will vary according to the strength of the corrosion, vapors employed; and, to some extent, according to the quality of the metallic lead. By using weaker vapors and effecting the corrosion more slowly than above described, I can produce very much higher grades or qualities of the pigment by my improved process.

Before treating metallic lead on a commercial scale according to my process, I test a sample of the lead in the laboratory to ascertain the required strength and proportions of the corroding agents to be employed and the periods during which such agents should be applied, or the intervals which should elapse between the successive applications of the acid vapor, steam and air and of the basic cream, and to find out the proper strength or concentration of the acid vapor and basic cream. With some of the cheaper qualities of metallic lead, the application of these agents will require to be repeated at intervals of about from eight to ten hours and stronger or more concentrated acid and basic cream employed. With some of the better qualities of metallic lead it will suffice to apply these agents once in every thirty or forty hours, or even at longer intervals, or, weaker or less concentrated acid vapor and basic cream may be employed.

The difference between my white lead and that made by the processes hitherto adopted, can be readily distinguished by subjecting the same to microscopical examination; by the application of the paint to a surface by means of a brush handled by an experienced painter, and also by grinding in oil mixtures of the white lead with measured quantities of black or tinted pigment for comparison in respect of shade with any sample, the lighter shade being in degree the pigment of greater covering power and capacity.

White lead consists of varying proportions (mechanical mixtures) of flat, long or tubular prismatic crystals, which are transparent or semi-transparent, and of efflorescent rounded opaque particles of a peculiarly brilliant whiteness distributed among the said crystals. The covering power of the compound depends upon the percentage of these opaque rounded particles. And I have found that, under certain conditions, which sometimes occur in the manufacture of white lead as hitherto carried on this opaque product is reconverted into the transparent crystals above mentioned thus diminishing the covering power of the compound and causing a great waste of acid.

Now by my process, I produce a compound containing a larger percentage than the white lead heretofore made, of the aforesaid opaque rounded particles so that the covering power of my improved compound and its capacity to effect the solidification or drying and hardening of the oil are greatly increased as compared with white lead as heretofore manufactured, and my improved compound is by reason of the small proportion of the flat tubular prismatic crystals (as hereinbefore appears) and also by reason of the almost entire absence of metallic lead free from liability to further corrosion in the atmosphere.

My improved white lead has for the reasons just mentioned more opacity and covering power than ordinary white lead, and has a greater power of solidifying or drying and hardening the oil.

By my invention, moreover, I am enabled to advantageously utilize in the manufacture of white lead the cheaper qualities of metallic lead, the treatment of which by the processes hitherto adopted has been found impracticable by reason of the discolorations which are imparted to the products.

What I claim is—

1. The improved process of manufacturing white lead, consisting in first forming curled, twisted or tangled strips, ribbons or cuttings of metallic lead of dimensions proportionate to the desired height of the pile thereof and to the quality of the metal as above described, dipping or immersing the said strips or cuttings in basic cream and, after draining the same, piling them on trays or grids so as to leave suitable vapor ways as above described, and then inserting the charge thus prepared, in the corroding or converting chamber and repeatedly subjecting it therein alternately to the action of acid vapor mixed with steam and atmospheric air and applied locally or generally to the charge on each tray or grid, and to the action of purified carbonic acid gas caused to diffuse slowly in and through the said chamber and applying to the charge from time to time and locally or generally as required a shower or spray of basic cream, substantially as hereinbefore described.

2. In the manufacture of white lead, subjecting the charge of lead strips or cuttings proportioned and piled as hereinbefore described, alternately to the action of acid vapor mixed with steam and atmospheric air, and of basic cream, and to the action of carbonic acid, applied in the manner and approximately for the periods above described, such periods being varied according to the quality of the metal to be treated and according to the state of the charge and the progress of the corrosion at intervals throughout the process, substantially as above set forth.

3. In the manufacture of white lead, the treatment of the charge in the corroding chamber, with acid vapors and basic cream of varying degrees of concentration or strength according to the irregularities observed in the corrosion of the said charge, substantially as hereinbefore described.

ARTHUR JAMES SMITH.

Witnesses:
JOHN T. KNOWLES,
ALEXANDER W. ALLEN.